United States Patent
Tseng et al.

(10) Patent No.: US 10,753,753 B2
(45) Date of Patent: Aug. 25, 2020

(54) VEHICLE ROUTE NAVIGATION

(71) Applicant: Ford Global Technologies, LLC, Dearborn, MI (US)

(72) Inventors: Fling Finn Tseng, Ann Arbor, MI (US); Shiqi Qiu, Canton, MI (US); Pankaj Kumar, Dearborn, MI (US); Hassene Jammoussi, Canton, MI (US); Fakhreddine Landolsi, Canton, MI (US); Imad Hassan Makki, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 473 days.

(21) Appl. No.: 15/606,565

(22) Filed: May 26, 2017

(65) Prior Publication Data

US 2018/0340782 A1 Nov. 29, 2018

(51) Int. Cl.
*G01C 21/34* (2006.01)
*G05D 1/02* (2006.01)
*G01C 21/36* (2006.01)

(52) U.S. Cl.
CPC ......... *G01C 21/3415* (2013.01); *G05D 1/021* (2013.01); *G01C 21/3685* (2013.01); *G05D 2201/0212* (2013.01)

(58) Field of Classification Search
CPC ............ G01C 21/3415; G01C 21/3685; G01C 21/3492; G05D 1/021; G05D 2201/0212; G05D 2201/0213; G08G 1/0968
See application file for complete search history.

(56) References Cited

U.S. PATENT DOCUMENTS

| | | | |
|---|---|---|---|
| 5,428,545 A | 6/1995 | Maegawa et al. | |
| 5,835,008 A | 11/1998 | Colemere, Jr. | |
| 6,236,933 B1 | 5/2001 | Lang | |
| 8,718,861 B1 | 5/2014 | Montemerlo et al. | |
| 9,047,773 B2 | 6/2015 | Chen et al. | |
| 9,367,065 B2 | 6/2016 | Dolgov et al. | |
| 9,541,410 B1* | 1/2017 | Herbach | B60W 30/00 |
| 2005/0021227 A1* | 1/2005 | Matsumoto | G01C 21/3415 |
| | | | 701/431 |
| 2006/0167626 A1 | 7/2006 | Haashizume | |
| 2007/0156336 A1 | 7/2007 | Chang et al. | |
| 2012/0310465 A1 | 12/2012 | Boatright et al. | |

(Continued)

FOREIGN PATENT DOCUMENTS

| | | |
|---|---|---|
| CN | 106403972 A | 2/2017 |
| EP | 1806562 A2 | 7/2007 |

(Continued)

OTHER PUBLICATIONS

GB Search Report dated Nov. 22, 2018 re GB Appl. 1808403.8.

*Primary Examiner* — Michael J Zanelli
(74) *Attorney, Agent, or Firm* — Frank A. MacKenzie; Bejin Bieneman PLC

(57) ABSTRACT

A computer determines that a rate of travel value for a route segment being traversed by a first vehicle exceeds a predetermined threshold. A maneuver is planned for the first vehicle to depart from the route segment based on collected vehicle operating data from one or more second vehicles previously traversing the route segment. The first vehicle is instructed to execute the maneuver to depart the route segment.

20 Claims, 4 Drawing Sheets

(56) References Cited

U.S. PATENT DOCUMENTS

| | | | |
|---|---|---|---|
| 2015/0314780 A1* | 11/2015 | Stenneth | B60W 30/00 |
| | | | 701/23 |
| 2015/0319093 A1* | 11/2015 | Stolfus | H04L 12/6418 |
| | | | 370/237 |
| 2016/0225255 A1* | 8/2016 | Thakur | G08G 1/0112 |
| 2016/0334230 A1* | 11/2016 | Ross | G01C 21/3415 |
| 2016/0357187 A1 | 12/2016 | Ansari | |
| 2016/0368492 A1 | 12/2016 | Al-Stouhi | |
| 2017/0031359 A1* | 2/2017 | Shashua | G01C 21/32 |
| 2017/0213460 A1* | 7/2017 | Massey | B60W 30/08 |

FOREIGN PATENT DOCUMENTS

| | | |
|---|---|---|
| WO | 2008110321 A1 | 9/2008 |
| WO | 2012104392 A1 | 8/2012 |

* cited by examiner

VEHICLE ROUTE NAVIGATION

BACKGROUND

Vehicles may travel along predetermined routes on roadways. Traffic loads on route segments of the routes can vary depending on when the vehicles travel along the routes. Each vehicle can selectively stay in the route segment or depart from the route segment based on the traffic load. Furthermore, each departing vehicle may implement a different maneuver to depart from the route segment. It is a problem that at present vehicles lack ways to obtain and analyze information concerning lane travel and lane departure, and to control vehicle maneuvers concerning when and how to depart from a roadway lane,

DETAILED DESCRIPTION

Figure 1:
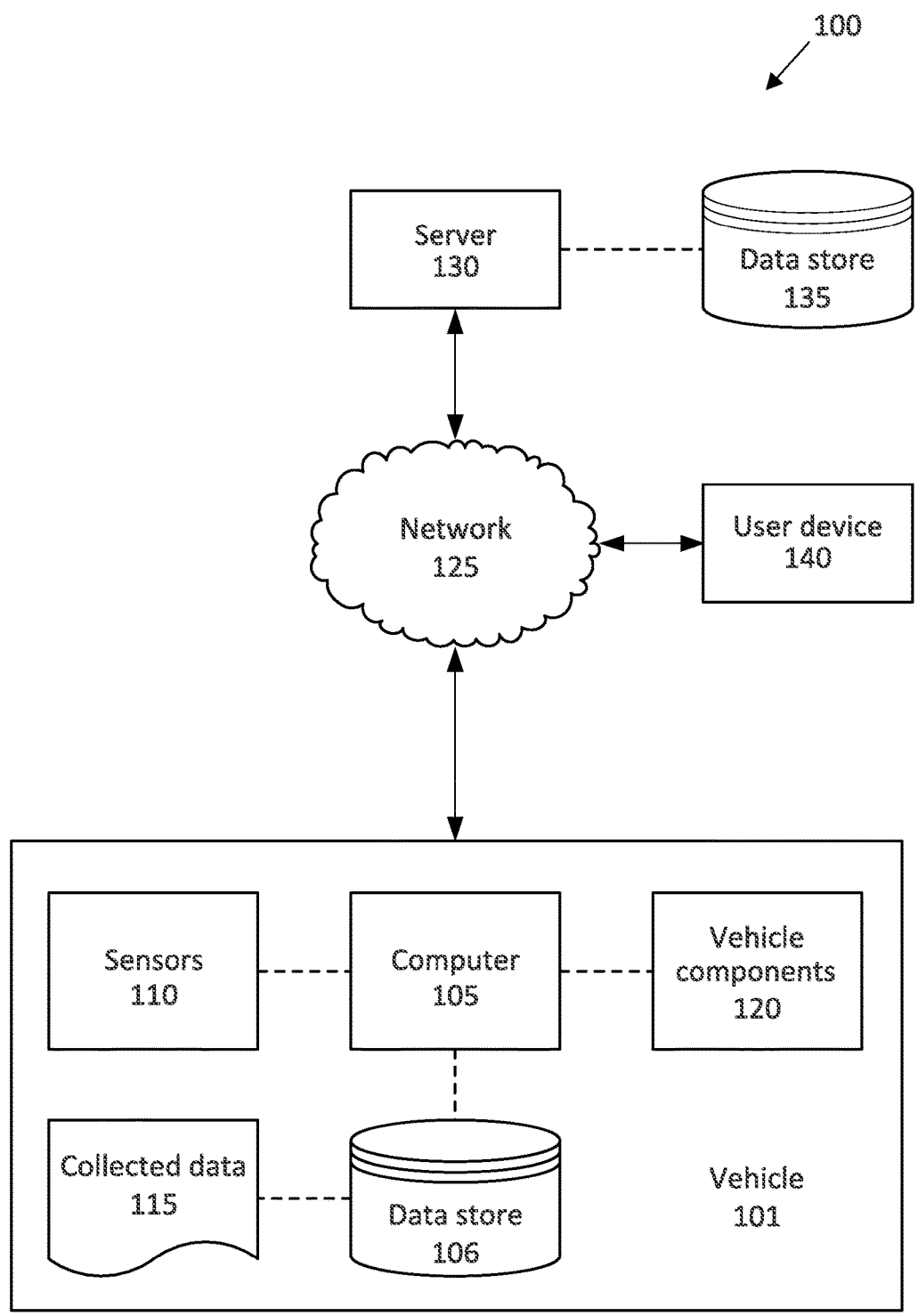
FIG. 1 is a block diagram of an example system for operating a vehicle.

A system includes a computer programmed to determine that a rate of travel value for a route segment being traversed by a first vehicle exceeds a predetermined threshold, plan a maneuver for the first vehicle to depart from the route segment based on collected vehicle operating data from one or more second vehicles previously traversing the route segment, and instruct the first vehicle to execute the maneuver to depart the route segment.

The rate of travel value can be a time elapsed in the route segment by the first vehicle. The rate of travel value can be a speed of the first vehicle. The rate of travel value can be a distance driven in the route segment by the first vehicle.

The computer can be further programmed to prompt a user in the first vehicle for input to instruct the computer to plan the maneuver.

The computer can be further programmed to instruct the first vehicle to operate in a manual mode upon determining that the rate of travel value exceeds the predetermined threshold.

The computer can be further programmed to, upon identifying an upcoming route segment for which the rate of travel value exceeds the predetermined threshold, modify a route of the first vehicle to avoid the upcoming route segment.

The computer can be further programmed to identify a parking location in a second route segment, and, upon determining that the rate of travel value for the second route segment does not exceed the predetermined threshold, provide the first vehicle with a route to a parking location.

The first vehicle can include a computer programmed to determine that the rate of travel value for the route segment being traversed by the first vehicle exceeds the predetermined threshold and to request the maneuver for the first vehicle to depart the route segment. The vehicle computer can be programmed to receive data about the route segment from the computer and to determine the rate of travel value based on the received data.

A method includes determining that a rate of travel value for a route segment being traversed by a first vehicle exceeds a predetermined threshold, planning a maneuver for the first vehicle to depart from the route segment based on collected vehicle operating data from one or more second vehicles previously traversing the route segment, and instructing the first vehicle to execute the maneuver to depart the route segment.

The rate of travel value can be based on a time elapsed in the route segment by the first vehicle. The rate of travel value can be based on a speed of the first vehicle. The rate of travel value can be based on a distance driven in the route segment by the first vehicle.

The method can further include prompting a user in the first vehicle for input to plan the maneuver.

The method can further include instructing the first vehicle to operate in a manual mode upon determining that the rate of travel value exceeds the predetermined threshold.

The method can further include, upon identifying an upcoming route segment for which the rate of travel value exceeds the predetermined threshold, modifying a route of the first vehicle to avoid the upcoming route segment.

The method can further include identifying a parking location in a second route segment, and, upon determining that the rate of travel value for the second route segment does not exceed the predetermined threshold, providing the first vehicle with a route to a parking location.

The method can further include the first vehicle determining that the rate of travel value for the route segment being traversed by the first vehicle exceeds the predetermined threshold and requesting the maneuver for the first vehicle to depart the route segment. The method can further include the first vehicle receiving data about the route segment and determining the rate of travel value based on the received data.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

FIG. 1 illustrates an example system 100 for operating a vehicle 101 along a roadway. A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of an object, determining the presence of a user, etc. The sensors 110 could also include short range radar, long range radar, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 includes a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, BLE, IEEE 802.11, vehicle-to-vehicle (V2V) such as Dedicated Short Range Communications (DSRC), etc.), local area networks (LAN) and/or wide area networks (WAN), including the Internet, providing data communication services.

The system 100 may include a user device 140. As used herein, a "user device" is a portable, computing device that includes a memory, a processor, a display, and one or more input mechanisms, such as a touchscreen, buttons, etc., as well as hardware and software for wireless communications such as described herein. Accordingly, the user device 140 may be any one of a variety of computing devices including a processor and a memory, e.g., a smartphone, a tablet, a personal digital assistant, etc. The user device 140 may use the network 125 to communicate with the vehicle computer 105. For example, the user device 140 can be communicatively coupled to the vehicle computer 105 with wireless technologies such as described above.

Figure 2:
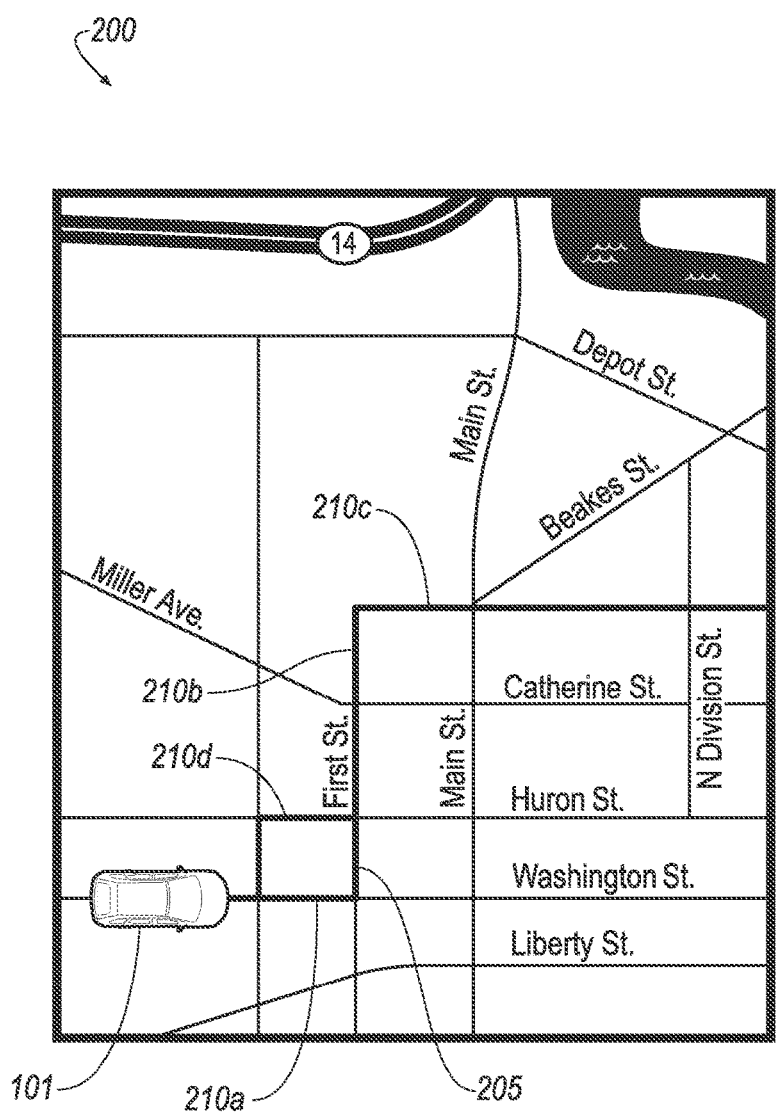
FIG. 2 illustrates an example route along which the vehicle travels.

FIG. 2 illustrates an example map 200. The map 200 can be stored in the data store 135 of the server 130 and/or the data store 106 of the computer 105. The server 130 can send information from the map 200 to the computer 105 over the network 125. Alternatively or additionally, the map 200 can be stored in a plurality of computers 105 in a plurality of respective vehicles 101 connected with a distributed network 125.

The map 200 includes a route 205 to be traversed by the vehicle 101. The route 205 includes a plurality of route segments 210, shown in FIG. 2 as example route segments 210a, 210b, 210c, 210d. The vehicle 101 can travel from the route segment 210a to the route segment 210b and then to the route segment 210c. The vehicle 101 can travel from the route segment 210a to the route segment 210d to get to the route segment 210b when a rate of travel value in the route segment 210a is above a threshold. The computer 105 can determine the route 205 by identifying the route segments 210 between a current location of the vehicle 101 and a destination.

The server 130 can receive operating data 115 from vehicles 101 traversing along route segments 210. The operating data 115 can include current and/or historical vehicle state data, e.g., one or more of a steering wheel angle, an accelerator pedal position, a brake pedal position, a geo-location coordinate, etc. Based on the operating data 115, the server 130 can determine how each vehicle 101 departed each route segment 210. For each vehicle 101 departing a route segment 210, the server 130 can collect geo-location data 115, speed data 115, acceleration data 115, turn data 115, etc., to generate a predicted path that the vehicle 101 followed to depart from the route segment 210. Based on the data 115 and predicted paths, the server 130 can plan a maneuver for a vehicle 101 about to enter the route segment 210 to depart from the route segment 210.

The server 130 can plan one or more maneuvers to depart from the route segment 210 based on the collected operating data 115 indicating how previous vehicles 101 left the route segment 210. As used herein, a "maneuver" is a route and instructions for following the route for the vehicle 101 to depart from the route segment 210. For example, the server 130 can store a plurality of preplanned maneuvers based on the operating data 115 and can select one of the maneuvers based on, e.g., a current location of the vehicle 101 in the route segment 210. Alternatively or additionally, the server 130 can, upon determining the location of the vehicle 101 in the route segment 210 and determining to plan a maneuver, compare the previously collected paths from the operating data 115 to the location of the vehicle 101 and select portions of the previously collected paths that would move the vehicle 101 out of the route segment 210.

The server 130 can determine to plan the maneuver based on a rate of travel value in the route segment 210. As used herein, a "rate of travel value" is a measurement quantity of (or derived from) operating data 115 of the vehicle 101 in a route segment 210 that represents a rate at which the vehicle 101 is traveling in the route segment. The rate of travel value can be affected by, e.g., other vehicles 101, objects and obstacles in the route segment 210, etc. A rate of travel value is not necessarily a speed or velocity measurement but can alternatively or additionally be, e.g., a time elapsed in the route segment 210 in seconds, a distance traversed in the route segment 210 in meters in a given time, a percentage of progress through the route segment 210 in a given amount of time, a percentage of a speed of the vehicle 101 in the route segment 210 as against a stored typical speed in the route segment 210, a percentage of distance traversed in a period of time in the route segment 210 as against a typical distance traversed in the segment 210 in the period of time, etc. An example process for determining the rate of travel value is described below in a process 400 and shown in FIG. 4.

The rate of travel value can be compared to a predetermined threshold stored in the server 130 and/or the computer 105 to determine whether to plan a maneuver for the vehicle 101 to depart from the route segment 210. The predetermined threshold can be determined based on, e.g., average rate of travel values for a route segment 210 from a plurality of vehicles 101, expected rate of travel values for a route segment 210 based on posted speed limit and traffic signs, average times for vehicles 101 to traverse the segment 210, etc. For example, a rate of travel threshold could be a percentage of a typical speed for the segment 210, e.g., 66.6%.

When the rate of travel value in the route segment 210a exceeds the predetermined threshold, the vehicle 101 can depart from the route segment 210a to another route segment 210d with a rate of travel value below the threshold determined from, e.g., operating data 115 from other vehicles 101 in the route segment 210d. The server 130 can collect operating data 115 from the vehicle 101 departing the route segment 210a and plan a maneuver based on the collected operating data 115, i.e., based on how the vehicle 101 departed from the route segment 210a. Thus, when another vehicle 101 is in the route segment 210a and the rate of travel value exceeds the threshold, the server 130 can plan a maneuver and instruct the computer 105 to actuate one or more vehicle components 120 according to the planned maneuver to depart from the route segment 210a to the route segment 210d.

The server 130 can determine that the rate of travel value in the route segment 210 exceeds the predetermined threshold based on the operating data 115 collected from the vehicle 101. The server 130 can determine the rate of travel value based on, e.g., a time spent in the route segment 210, the proximity of location coordinates of the vehicle 101 over a period of time, a distance driven in the route segment 210, an average speed of the vehicle 101 in the route segment 210, etc. For example, when the vehicle 101 is circling in the route segment 210a looking for a parking spot and/or the vehicle 101 has crossed one or more roadway lanes in the route segment 210a and/or the vehicle 101 has driven forward and backward in the route segment 210a to avoid an obstacle, the server 130 can receive operating data 115 indicating that the distance driven in the route segment 210a exceeds the length of the route segment 210a. That is, the rate of travel value is the distance driven in the route segment 210a, and the threshold is the length of the route segment 210a. Upon determining that the distance driven in the route segment 210a exceeds the length of the route segment 210a, the server 130 can determine that the rate of travel value exceeds the threshold and plan a maneuver for the vehicle 101 to depart from the route segment 210a.

The server 130 can determine an average speed of the vehicle 101 in the route segment 210 as the rate of travel value. The server 130 can compare the average speed of the vehicle 101 in the route segment to average speed of previous vehicles 101 in the route segment 210. When the average speed of the vehicle 101 in the route segment 210 is below the average speed of previous vehicles 101 in the route segment 210 by more than a speed threshold, the server 130 can determine to plan the maneuver for the vehicle 101 to depart from the route segment 210. That is, the rate of travel value can be the difference between the average speed of the vehicle 101 and the average speed of previous vehicles 101 in the route segment, and the rate of travel value threshold can be the speed threshold.

The server 130 can determine a traversal time threshold T for the route segment 210:

$$T = a\left(\frac{L}{V}\right) + b \qquad (1)$$

where L is a length of the route segment 210, V is an expected speed for the route segment 210 based on previously collected operating data 115 from vehicles 101 in the route segment 210, and a, b are constant coefficients that are based on previously collected operating data 115 of speed and time of vehicles 101 in the route segment 210. When the time spent in the route segment 210, as determined by the server 130 based on data 115 received from the vehicle 101, exceeds the traversal time threshold T, the server 130 can determine that the rate of travel value in the route segment 210 exceeds the threshold.

The server 130 can compare location data 115 points of the vehicle 101 to determine whether the rate of travel value in the route segment 210 exceeds the threshold. The server 130 can receive a plurality of geo-location coordinates from the vehicle 101 indicating locations of the vehicle 101 in a predetermined period of time prior to a current time (e.g., over the previous 5 minutes). The server 130 can, using known techniques, compare a distance between each of the plurality of the geo-location coordinates and determine a location circle that encircles the plurality of the geo-location coordinates, i.e., a circle in which all the geo-location coordinates are inside or on the edge of the circle. In this example, the rate of travel value is the radius of the location circle, and the threshold is a predetermined threshold radius stored in the server 130 and/or the computer 105. The location circle can be determined by determining a distance between each pair of geo-location coordinates, identifying a largest distance between the pairs of geo-location coordinates, and inscribing a circle with a diameter equal to the largest distance with the pair of geo-location coordinates having the largest distance defining diametrically opposing points on the circle. The server 130 can compare the radius of the location circle to the predetermined threshold radius, and when the radius of the location circle is less than the threshold radius, the server 130 can determine that the rate of travel value exceeds the threshold. When the radius of the location circle is less than the threshold radius, the vehicle 101 location may by circling around a specific location, e.g., looking for a parking spot, stuck in traffic, etc. Alternatively, the server 130 can compare the largest distance between the pairs of geo-location coordinates to a predetermined distance threshold and determine that the rate of travel value exceeds the threshold when the largest distance is greater than the predetermined distance threshold.

The computer 105 can be programmed to determine the rate of travel value as described above for the route segment 210 being traversed by the vehicle 101. When the computer 105 determines that the rate of travel value for the route segment 210 exceeds the predetermined threshold, the computer 105 can be programmed to request the maneuver for the vehicle 101 from the server 130 over the network 125 to depart the route segment 210.

The server 130 can be programmed to instruct the computer 105 to operate the vehicle 101 in a manual mode upon determining that the rate of travel value exceeds the predetermined threshold. When the vehicle 101 is operating in the autonomous or semi-autonomous mode, the server 130 can determine that the user should operate the vehicle 101 in the manual mode when the rate of travel value exceeds the threshold. Thus, the operator of the vehicle 101 can determine whether to depart from the route segment 210. The server 130 can instruct the computer 105 to return control of the vehicle components 120 to the operator in the manual mode.

The server 130 can be programmed to, upon identifying an upcoming route segment 210 for which the rate of travel value exceeds the predetermined threshold, modify a route 205 of the vehicle 101 to avoid the upcoming route segment 210. The server 130 can collect data 115 from vehicles 101 in upcoming route segments 210 and, upon determining that the rate of travel value in those route segments 210 exceeds the threshold, modifying routes 205 of vehicles 101 in previous route segments 210. For example, if the vehicle 101 is currently in the route segment 210a, and the server 130 determines that the rate of travel value in the route segment 210b exceeds the threshold, the server 130 can determine to modify the route of the vehicle 101 to avoid the route segment 210b. That is, the server 130 can identify one or more route segments 210 (e.g., the route segment 210d) to move the vehicle 101 from the route segment 210a to the route segment 210c.

The server 130 can be programmed to identify a parking location in a route segment 210. Upon determining that the rate of travel value for the current route segment 210 does not exceed the predetermined threshold, the server 130 can provide the vehicle 101 with a route 205 to a parking location. If the server 130 determines that the rate of travel value for the current route segment 210 exceeds the predetermined threshold, the server 130 can identify a different route segment 210 having a rate of travel value below the threshold and a parking location in the different route segment 210. For example, the server 130 can compare rate of travel values of the vehicle 101 based on operating data 115 collected in a previously traversed route segment 210 and identify a previously traversed route segment 210 having a rate of travel value below the threshold. Alternatively, the server 130 can determine a rate of travel value in another route segment 210 based on operating data 115 by a second vehicle 101 and, when the rate of travel value based on the second vehicle 101 operating data 115 is below the threshold, identify a parking location in that route segment 210 for the vehicle 101. By identifying a different route segment 210 having a rate of travel value below the threshold, the vehicle 101 can depart from the current route segment 210 (where the rate of travel value exceeds the threshold) to park in the parking location (in the route segment 210 where the rate of travel value is below the threshold). For example, if the vehicle 101 is in the route segment 210c and the rate of travel value exceeds the threshold, the server 130 can determine that the route segment 210b has a rate of travel value below the threshold, identify a parking location in the route segment 210b, and plan a maneuver to move the vehicle 101 from the route segment 210c to the parking location in the route segment 210b.

The server 130 can be programmed to instruct the computer 105 to prompt the user to instruct the server 130 to plan the maneuver. The user of the vehicle 101 may prefer to follow the route 205 and not to depart from the route segment 210, and the server 130 may be programmed to plan the maneuver only upon instruction from the user. Furthermore, in certain circumstances, the operating data 115 can indicate that the rate of travel value is above the threshold even when there is little or no traffic in the route segment 210. For example, if the vehicle 101 is idling in the route segment 210 (e.g., waiting to pick up another user, filling a fuel tank, etc.), the traversal time in the route segment 210 can exceed the time threshold, and the server 130 can determine that the rate of travel value exceeds the threshold. The server 130, upon determining that the route segment 210 could have a rate of travel value above the threshold, can request input from a user of the vehicle 101 to identify the rate of travel value in the road segment 210. The computer 105 can provide a prompt to the user to identify the rate of travel value and allow the server 130 to plan a maneuver. The computer 105 can provide the prompt for user input on, e.g., a vehicle 101 human-machine interface (HMI) such as a touchscreen display and/or on a display of the user device 140. The user input can be, e.g., a tactile input (e.g., touching the display of the user device 140), an audio input, a visual input (e.g., a gesture captured by a user device 140 camera), etc. The user input is a typically a selection of a Boolean value, e.g., a YES or a NO, that the server 130 uses to determine whether to plan the maneuver. For example, when the user input is a YES, the server 130 determines to plan the maneuver. When the user input is a NO or the user does not provide input after a predetermined period of time has elapsed, the server 130 determines not to plan the maneuver. When the user provides the input instructing the server 130 to plan the maneuver, the computer 105 can send the input to the server 130 over the network 125, and the server 130 can plan the maneuver for the vehicle 101 to depart from the route segment 210. Alternatively, the server 130 can plan the maneuver without input from the user. In yet another alternative, the server 130 can plan the maneuver and instruct the computer 105 to present the maneuver to the user and prompt the user for a Boolean input (i.e., YES or NO) to accept the maneuver. If the user provides a YES input, the server 130 can instruct the computer 105 to actuate one or more vehicle components 120 according to the maneuver. If the user provides a NO input, the server 130 can instruct the computer 105 to operate in a manual mode, allowing the user to operate the vehicle components 120 with manual input.

Figure 3:
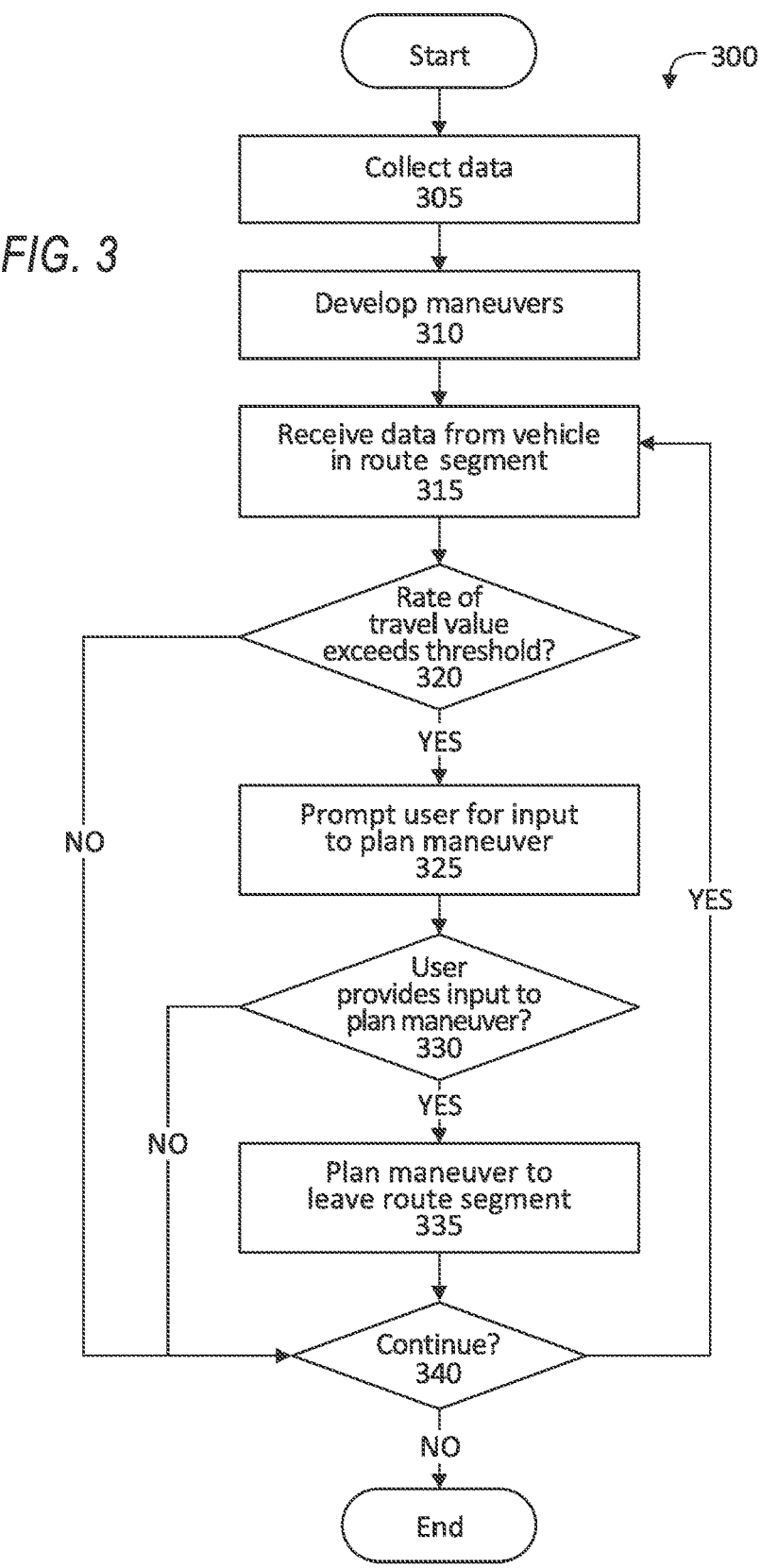
FIG. 3 is a block diagram of an example process for operating the vehicle to leave a route segment.

FIG. 3 illustrates an example process 300 for operating a vehicle 101 in a route segment 210. The process 300 begins in a block 305, in which the server 130 collects data 115 from a plurality of vehicles 101. As described above, the data 115 can include, e.g., traffic data, maneuver data, location data, etc. Computers 105 in the vehicles 101 can send the data 115 over the network 125 to the server 130.

Next, in a block 310, the server 130 develops a plurality of maneuvers for each route segment 210 based on the collected operating data 115 of vehicles 101 leaving the route segments 210. For each route segment 210, as described above, the server 130 can develop one or more maneuvers to depart from the route segment 210 based on, e.g., traffic data 115 and operating data 115 from prior vehicles 101 departing the route segment 210.

Next, in a block 315, the server 130 receives operating data 115 from a vehicle 101 in one of the route segments 210. For example, the computer 105 in the vehicle 101 in the route segment 210a as shown in FIG. 2 can send operating data 115 of the vehicle 101 to the server 130 over the network 125.

Next, in a block 320, the server 130 determines whether the rate of travel value exceeds a predetermined threshold, e.g., such as described above. The server 130 can determine whether the rate of travel value exceeds the threshold based on the vehicle 101 operating data, e.g., according to the process 400 described below. Alternatively, the computer 105 can determine whether the rate of travel value exceeds the predetermined threshold. When the rate of travel value exceeds the threshold, the process 300 continues in a block 325. Otherwise, the process 300 continues in the block 340.

In the block 325, the server 130 instructs the computer 105 to prompt the user in the vehicle 101 to provide input to instruct the server 130 to plan the maneuver. The computer 105 can provide a prompt, e.g., for a selection of a Boolean value (e.g., YES or NO), on a vehicle 101 human-machine interface (HMI), e.g., a display, and/or a user device 140 that can receive input from the user. The prompt can ask the user to instruct the server 130 to plan the maneuver.

Next, in a block 330, the server 130 determines whether the user has provided input to instruct the server 130 to plan the maneuver. As described above, the computer 105 can receive an input from the user indicating whether the user instructing the server 130 to plan the maneuver. The computer 105 can send the input over the network 125 to the server 130. If the input indicates that the user instructs the server 130 to plan the maneuver, the process 300 continues in a block 335. Otherwise, the process 300 continues in the block 340. Alternatively or additionally, the server 130 can be programmed to plan the maneuver without input from the user, the blocks 325 and 330 are optional. When the server 130 is programmed to plan the maneuver without input from the user, the server 130 can proceed from the block 320 directly to the block 335.

In the block 335, the server 130 plans a maneuver for the vehicle 101 to depart from the route segment 210. As described above, the server 130 can select one of the previously determined maneuvers for the vehicle 101 and/or can plan a new maneuver based on the previously determined maneuvers and the operating data 115 of the vehicle 101. For example, the server 130 can select a maneuver that would move the vehicle 101 from the route segment 210 having a shortest distance from a current vehicle 101 location to a departure point of the route segment 210. In another example, the server 130 can select a maneuver that has a fewest amount of turns for the vehicle 101 to depart from the route segment 210. The computer 105 can actuate one or more components 120 according to the maneuver to depart from the route segment 210.

In the block 340, the server 130 determines whether to continue the process 300. For example, the server 130 can determine that the vehicle 101 has parked at a parking spot and determine not to continue the process 300 if the vehicle 101 is parked. In another example, the server 130 can determine that the vehicle 101 is still in a route segment 210, and can determine to continue the process 300. If the server 130 determines to continue the process 300, the process 300 returns to the block 315 to receive more operating data 115. Otherwise, the process 300 ends.

Figure 4:
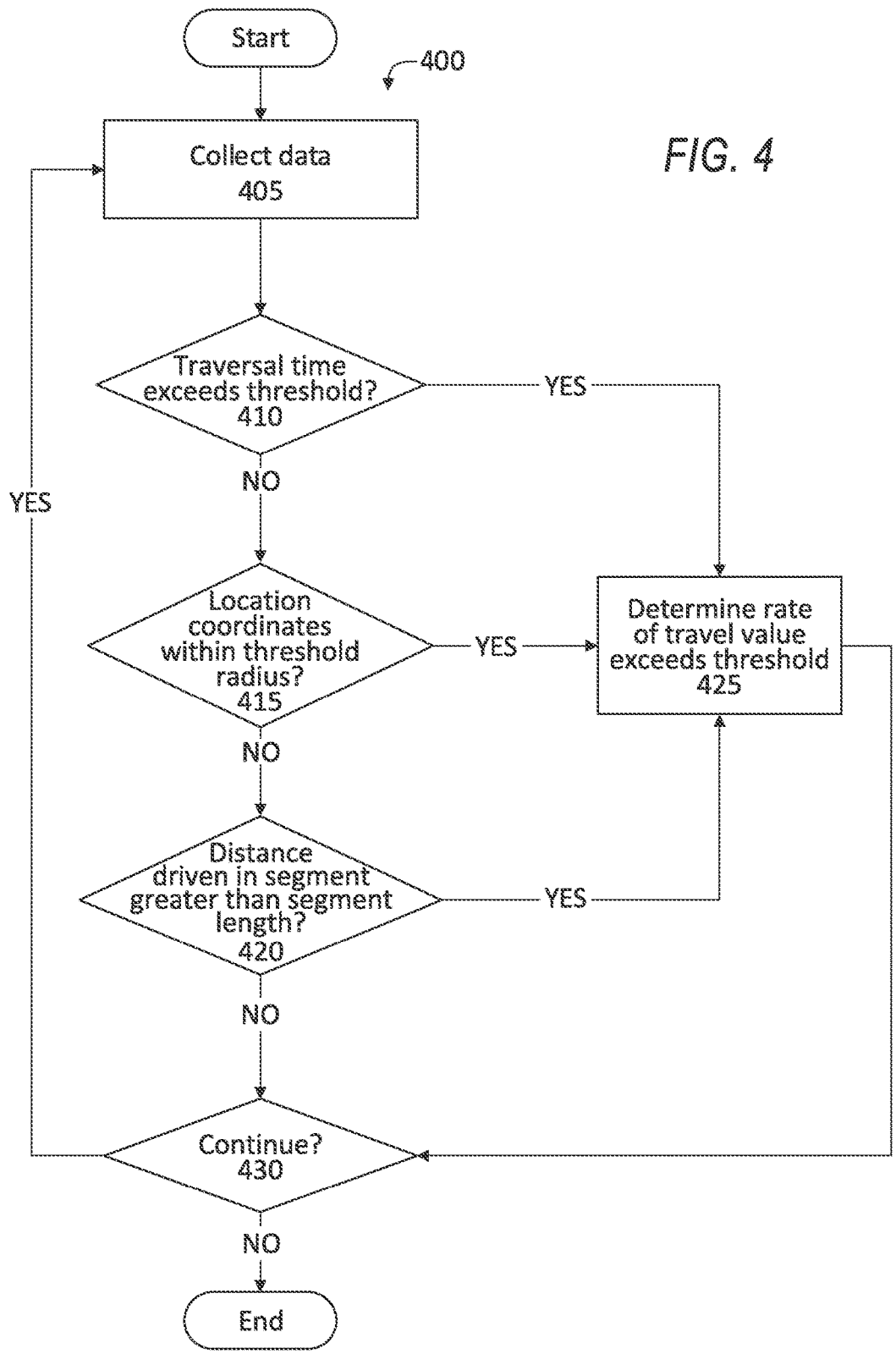
FIG. 4 is a block diagram of an example process for determining that a rate of travel value exceeds a threshold.

FIG. 4 illustrates an example process 400 for determining whether a rate of travel value for the route segment 210 exceeds a threshold. The process 400 begins in a block 405, in which the server 130 collects operating data 115 from the vehicle 101.

Next, in a block 410, the server 130 determines whether the traversal time in the route segment 210 exceeds a time threshold. As described above, the server 130 can compare time data 115 of when the vehicle 101 entered the route segment 210 to current time data 115 to determine how long the vehicle 101 has spent in the route segment 210. If the traversal time exceeds the time threshold, the process 400 continues in a block 425. Otherwise, the process 400 continues in a block 415.

In the block 415, the server 130 compares a plurality of geo-location coordinates of the vehicle 101 in the route segment 210 and determines whether a radius of a location circle inscribing all the geo-location coordinates, as described above, is within a threshold radius. When the radius of the location circle is within the threshold radius, the vehicle 101 could be circling around looking for a parking spot (e.g., after dropping off users at a destination) or stuck in traffic. If the location data 115 are within the threshold radius, the process 400 continues in the block 425. Otherwise, the process 400 continues in a block 420.

In the block 420, the server 130 determines whether the distance driven in the route segment 210 by the vehicle 101 exceeds the length of the route segment 210. The server 130 can compare location data 115 of the vehicle 101 to the length of the route segment 210 and determine how far the vehicle 101 has driven in the route segment 210. If the vehicle 101 is circling around the route segment 210 looking for a parking spot, i.e., the vehicle 101 drives back and forth over one or more portions of the route segment 210, the location data 115 can indicate that the distance traveled in the route segment 210 exceeds the length of the route segment 210. If the distance driven in the route segment 210 by the vehicle 101 exceeds the length of the route segment 210, the process 400 continues in the block 425. Otherwise, the process 400 continues in a block 430.

In the block 425, the server 130 determines that the rate of travel value exceeds the threshold and plans a maneuver for the vehicle 101 to depart from the route segment 210, e.g., according to the block 325 of the process 300. As described above, the server 130 can plan the maneuver for the vehicle 101 based on previously collected vehicle 101 operating data 115.

Next, in a block 430, the server 130 determines whether to continue the process 400. For example, if the vehicle 101 has parked and shut down, the server 130 can determine not to continue the process 400. If the server 130 determines to continue the process 400, the process 400 returns to the block 405 to collect more data 115. Otherwise, the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer programmed to:
   determine that a rate of travel value for a route segment being traversed by a first vehicle exceeds a predetermined threshold;
   plan a maneuver for the first vehicle to depart from the route segment based on collected vehicle operating data from one or more second vehicles previously traversing the route segment; and
   instruct the first vehicle to execute the maneuver to depart the route segment.

2. The system of claim 1, wherein the rate of travel value is a time elapsed in the route segment by the first vehicle.

3. The system of claim 1, wherein the rate of travel value is a speed of the first vehicle.

4. The system of claim 1, wherein the rate of travel value is a distance driven in the route segment by the first vehicle.

5. The system of claim 1, wherein the computer is further programmed to prompt a user in the first vehicle for input to instruct the computer to plan the maneuver.

6. The system of claim 1, wherein the computer is further programmed to instruct the first vehicle to operate in a manual mode upon determining that the rate of travel value exceeds the predetermined threshold.

7. The system of claim 1, wherein the computer is further programmed to, upon identifying an upcoming route segment for which the rate of travel value exceeds the predetermined threshold, modify a route of the first vehicle to avoid the upcoming route segment.

8. The system of claim 1, wherein the computer is further programmed to identify a parking location in a second route segment, and, upon determining that the rate of travel value for the second route segment does not exceed the predetermined threshold, provide the first vehicle with a route to the parking location.

9. The system of claim 1, wherein the first vehicle includes a computer programmed to determine that the rate of travel value for the route segment being traversed by the first vehicle exceeds the predetermined threshold and to request the maneuver for the first vehicle to depart the route segment.

10. The system of claim 9, wherein the vehicle computer is programmed to receive data about the route segment from the computer and to determine the rate of travel value based on the received data.

11. A method, comprising:
    determining that a rate of travel value for a route segment being traversed by a first vehicle exceeds a predetermined threshold;
    planning a maneuver for the first vehicle to depart from the route segment based on collected vehicle operating data from one or more second vehicles previously traversing the route segment; and
    instructing the first vehicle to execute the maneuver to depart the route segment.

12. The method of claim 11, wherein the rate of travel value is based on a time elapsed in the route segment by the first vehicle.

13. The method of claim 11, wherein the rate of travel value is based on a speed of the first vehicle.

14. The method of claim 11, wherein the rate of travel value is based on a distance driven in the route segment by the first vehicle.

15. The method of claim 11, further comprising prompting a user in the first vehicle for input to plan the maneuver.

16. The method of claim 11, further comprising instructing the first vehicle to operate in a manual mode upon determining that the rate of travel value exceeds the predetermined threshold.

17. The method of claim 11, further comprising, upon identifying an upcoming route segment for which the rate of travel value exceeds the predetermined threshold, modifying a route of the first vehicle to avoid the upcoming route segment.

18. The method of claim 11, further comprising identifying a parking location in a second route segment, and, upon determining that the rate of travel value for the second route segment does not exceed the predetermined threshold, providing the first vehicle with a route to the parking location.

19. The method of claim 11, further comprising the first vehicle determining that the rate of travel value for the route segment being traversed by the first vehicle exceeds the predetermined threshold and requesting the maneuver for the first vehicle to depart the route segment.

20. The method of claim 19, further comprising the first vehicle receiving data about the route segment and determining the rate of travel value based on the received data.

* * * * *